United States Patent Office 3,229,917
Patented Jan. 18, 1966

3,229,917
PROCESS OF CLASSIFYING CALCINED CONDITIONED TITANIUM DIOXIDE PIGMENT SLURRIES
Roy Miller, Grimsby, England, and Peter Longbottom, Bunbury, Western Australia, Australia, assignors to Laporte Titanium Limited, London, England, a British company
No Drawing. Filed May 1, 1963, Ser. No. 277,674
4 Claims. (Cl. 241—16)

This invention relates to the treatment of calcined pigments containing titanium dioxide.

In the case of titanium dioxide produced by what is usually fererred to as the sulfate process, that is to say, by hydrolysing a solution of titanium sulphate, it is essential to calcine the precipitated titanium dioxide in order to produce an acceptable pigment. During such calcination, the pigment particles cohere to form small lumps and it is necessary to break the lumps up by grinding and then to separate the large particles, that is to say, those having diameters exceeding 5 microns, from the remaining fine particles. The large particles will generally be sintered aggregates of a small number of fine particles, which aggregates have not been broken down by the grinding operation. In the case of titanium dioxide produced by what is usually referred to as the chlorine process, that is to say, by reacting titanium tetrachloride vapor with an oxidising gas, undesirably large particles can arise in two different ways. First, when the reaction is carried out in a burner, the titanium dioxide particles necessarily remain for an appreciable period of time after their formation in a region wherein the temperature is high and, while they are in this region, the particles grow in size and this can lead to some of the particles becoming undesirably large. When the reaction is carried out in a fluidised bed, some of the particles making up the bed (which particles will either be wholly composed of titanium dioxide or be coated with titanium dioxide) are liable to be carried out of the reactor in the gas stream so that they become mixed with the fine pigment particles. Secondly, the pigment is commonly subjected to a de-gassing operation at an elevated temperature and, during this operation, the particles cohere to form small lumps and it is necessary to break the lumps up by grinding and then to separate the large particles, that is to say, those having diameters exceeding 5 microns, from the remaining fine particles. In this case, the large particles may be either single particles that have grown to an undesirably large size or sintered aggregates of a small number of fine particles, which aggregates have not been broken down by the grinding operation. Thus, even if the particles were not subjected to a de-gassing operation (in which case grinding would be unnecessary), classification of the particles would generally be required. Throughout the specification, the term "calcined" is used to indicate that the titanium dioxide has either undergone a separate calcination treatment (in the case of titanium dioxide produced by the sulphate process) or else has been subjected to the high temperatures that are inherent in the chlorine process, possibly together with an additional de-gassing operation.

The separation of the large particles from the fine particles is usually effected by centrifugal hydroclassification and one commonly used apparatus is a modified form of the apparatus known as the Bird centrifuge. The unmodified form of the apparatus is described in British patent specification No. 456,420 and comprises a frusto-conical centrifuging bowl disposed with its axis horizontal and mounted for rotation at high speed on a horizontal arbor. A frusto-conical screw conveyor is rotatably mounted on the arbor and is so positioned and dimensioned that it lies within the centrifuging bowl and just sweeps the internal surface of the bowl on rotation. In the modified form of the apparatus the screw conveyor is made fast with the arbor for rotation therewith and the arbor is hollowed out to pass a feed pipe which extends inwardly to a predetermined point for example, to a point approximately half way along the length of the centrifuging bowl. The portion of the arbor that surrounds the inner extremity of the feed pipe, wherever the inner extremity is set, and the adjacent portion of the conveyor-mounting are slotted to provide communication between the feed pipe and the bowl. This form of apparatus will hereinafter be referred to as a modified Bird centrifuge.

In operation, a slurry of the pigment to be separated is fed under gravity or pumped into the feed pipe and the screw conveyor and the centrifuging bowl are driven so that they both rotate in the same direction, the rate of rotation of the screw conveyor being slightly less than that of the centrifuging bowl. The slurry is thrown out through the slots into the centrifuging bowl where classification takes place. The greater part of the fine particles and also the liquid flow to the end of the bowl having the larger diameter where a suspension of the fine particles is discharged through apertures in the end wall of the bowl. The large particles together with the remaining fine particles on the other hand, are thrown against the inner surface of the centrifuging bowl by centrifugal force and are carried to the other end of the centrifuging bowl, which is open by the action of the screw conveyor.

In order to obtain satisfactory classification of the pigment particles it is essential that the slurry shall be fairly highly dispersed and it is therefore necessary to treat the slurry, before it enters the centrifuge, with a dispersing agent, for example, sodium silicate, sodium hydroxide or sodium phosphate. Of these dispersing agents, sodium silicate is preferred and is the one most commonly used.

If too great a quantity of dispersing agent is used, it is found that the solids deposited on the inner surface of the centrifuging bowl become thixotropic and this leads to a very high torque loading between the centrifuging bowl and the screw conveyor. If the torque between the centrifuging bowl and the screw conveyor exceeds the working maximum, a shear pin breaks to avoid damage to the centrifuge itself and operation ceases. Before operation can recommence, however, it is necessary not only to replace the shear pin, but also to clean out the whole apparatus, which is always substantially full during operation and which will have clogged up when the stoppage occurred. Cleaning out the apparatus after a stoppage can take several hours, which means that there is a serious loss of production.

The minimum quantity of dispersing agent that will give a high enough degree of dispersion to ensure satisfactory classification is only very slightly less than the quantity that causes the solids on the surface of the centrifuging bowl to become thixotropic. Further, these quantities vary from one batch of pigment to another and depend upon the time that elapses between incorporating the dispersing agent with the slurry and centrifuging the slurry. The consequences of these facts are that it is necessary to work close to the overload point of the centrifuge, that very accurate control of the quantity of dispersing agent used is essential and that, even with such accurate control, the degree of classification achieved is variable and operation is intermittent.

This invention provides a process for treating a calcined pigment containing titanium dioxide to facilitate centrifugal hydroclassification of the pigment, which comprises treating an aqueous slurry of the pigment with a quantity of an alkaline-reacting dispersing agent or medium sufficient to raise the pH of the slurry to a value of at least 8.0, and thereafter adding to the slurry a sufficient quantity of an acid-reacting reagent to reduce the pH of the slurry to a value within the range of from 6.6 to 7.6.

This treatment yields a slurry that has a sufficiently high degree of dispersion to give satisfactory classification. Also, when the slurry is centrifuged, the solids deposited on the inner surface of the centrifuging bowl are not unduly thixotropic. The method therefore enables satisfactory centrifugal hydroclassification of the pigment to be obtained and obviates the need to control the quantity of dispersing agent used very accurately.

The invention also provides a process for classifying a calcined pigment containing titanium dioxide, which comprises treating an aqueous slurry of the pigment with a quantity of an alkaline-reacting dispersing agent or medium sufficient to raise the pH of the slurry to a value of at least 8.0, thereafter adding to the slurry a sufficient quantity of an acid-reacting reagent to reduce the pH of the slurry to a value within the range of from 6.6 to 7.6 and subjecting the resulting dispersed slurry to centrifugal hydroclassification.

Advantageously, the total quantity of the dispersing agent or medium incorporated with the slurry is sufficient to raise the pH of the slurry to a value within the range of from 8.3 to 8.6.

The centrifugal hydroclassification of the dispersed slurry is preferably carried out in a modified Bird centrifuge. Instead, a Sharples centrifuge may be used. The Sharples centrifuge is generally similar to the Bird centrifuge, the main difference being that the centrifuging bowl and screw conveyor are cylindrical instead of frusto-conical. If desired, the Sharples centrifuge may be modified in a manner corresponding to that hereinbefore described in connection with the Bird centrifuge.

The fine material that remains after the coarse particles have been separated by the hydroclassification can be passed to a surface treatment plant for subjection to a surface treatment as described in Example 2 of British patent specification No. 18,463/59 and 40,676/59.

The concentration of coarse particles in the fine material passing from the centrifuge to the surface treatment plant can be determined by mixing a sample of the fine material with a small amount of PVA emulsion and drawing out the mixture on a Hegman gauge as is well known in the art. If the test shows the coarse particle content to be too high, then the hydroclassification conditions must be adjusted.

As an alternative test, a portion of the fine material may be continuously monitored by means of a sedimentation balance as described in German patent specification No. 1,013,903, or by measuring the electrical resistance changes that occur across a narrow circular orifice when a suitably dilute suspension of a portion of the fines is drawn through the orifice at a controlled rate (employing, for example, a Coulter counter). In this latter test the changes in electrical resistance are related to the mean particle size and particle size distribution of the titanium dioxide in the suspension.

The pigment may be ground either before the dispersing agent is incorporated with it or after the dispersing agent is incorporated with it and before the addition of the acid-reacting reagent. Advantageously, the pigment is wet ground after the dispersing agent is incorporated with it and before the acid-reacting reagent is added. The grinding may then be carried out using a wet ball mill, for example, a Podmore mill, which is a vibratory mill. The use of this type of mill was not previously satisfactory because, to ensure efficient grinding, the slurry has to be highly dispersed and the quantity of dispersing agent that has to be added for this purpose is greater than could be tolerated using the previously known method of effecting the necessary dispersion of the pigment. It was therefore previously necessary to dry grind the pigment using, for example, a Raymond mill.

Advantageously, sufficient water is incorporated with the large particles from the centrifuge to form a slurry, there is incorporated with this slurry a quantity of the dispersing agent sufficient to raise the pH of this slurry to a value of at least 8.0 and this slurry, which constitutes an alkaline-reacting dispersing medium, is incorporated with a further quantity of the pigment before the addition of the acid-reacting reagent. Preferably, before the said medium is incorporated with a further quantity of the pigment, at least a part of the said medium is passed through a cyclone or like separator to remove a small proportion of the large particles. This serves to counteract the build-up of large particles as a result of such recycling of the large particles from the centrifuge.

When the pigment is dry ground before the dispersing agent or medium is incorporated with it, the dispersing agent or medium is advantageously incorporated with an aqueous slurry of the pigment in two stages in the first of which a sufficient quantity of an alkaline-reacting dispersing agent is used to raise the pH value of the slurry to within the range of from 7.2 to 7.8 and in the second of which the pH value of the slurry is raised to a value within the range of from 8.3 to 8.6 by incorporating with the slurry a quantity of an alkaline-reacting dispersing medium obtained by incorporating with large particles separated by the centrifugal hydroclassification a sufficient quantity of water to form a second slurry and incorporating with the second slurry a quantity of the alkaline-reacting dispersing agent sufficient to raise the pH of the second slurry to a value above 8.3.

The dispersing agent may be aminomethylpropanol or monoisopropanolamine or sodium hydroxide or sodium phosphate. Advantageously, the dispersing agent is sodium silicate. If desired, more than one dispersing agent may be used.

The acid-reacting reagent may be a mineral acid or an aqueous solution of an acid-reacting salt (advantageously, sulphate) of a mineral acid, preferably aluminium sulphate or titanium sulphate or zirconium sulphate. Advantageously, acid-reacting reagent is an aqueous solution of sulphuric acid, which may conveniently be of approximately 20 grams per litre strength.

Advantageously, the concentration of titanium dioxide in the dispersed slurry that is subjected to centrifugal hydroclassification is within the range of from 300 to 600, preferably 400 to 500, grams per litre.

It will be appreciated that, in order to assist mixing of the various substances, stirring or some other form of agitation should normally be carried out.

It has been found that the process of the invention enables the output of classified fine particles from a given centrifuge to be considerably increased and that the decreased pH value (6.6 to 7.6 as compared with, say, 7.8 using the previous known method) of the material fed to the centrifuge does not result in any substantial reduction of the degree of classification obtained. If, on the other hand, the pH value is only increased to, say, 7.5 in the first instance, very poor classification is obtained.

The invention also provides a paint composition or a pigment material or a synthetic plastic material or paper or a paper laminate each containing classified fine pigment particles produced by the process of the invention. These particles may be further treated before they are incorporated in such materials.

The following two examples illustrate the invention:

*Example 1*

A quantity of calcined pigmentary titanium dioxide, which contained the usual residual quantity of conditioning agents, and rutile promoters, for example ZnO, was placed in a Podmore mill. Fully softened water (that is to say, water treated with an ion-exchange resin to replace Ca++ by Na+; its pH then being 8.4) and sodium silicate were also added to the mill in quantities sufficient to give a titanium dioxide slurry containing 700 grams of titanium dioxide per litre of the slurry and having a pH value of 9.2. The actual quantity of sodium silicate added was 0.5% by weight calculated as $SiO_2$ and based on the $TiO_2$ content of the slurry. The slurry was stirred throughout the addition of the sodium silicate.

The slurry was then ground in the mill sufficiently to enable substantially the whole of it to pass a 240 mesh (B.S.S.) sieve and was then passed into a holding tank. A further quantity of the fully softened water was added to the holding tank, with stirring, to reduce the concentration of titanium dioxide in he slurry to 450 grams per litre. The final pH value of this slurry was 8.5.

The slurry was then passed from the holding tank to a further tank where they were treated, while being stirred, with a sufficient quantity of an aqueous solution of sulphuric acid of 20 grams per litre strength to reduce the pH of the slurry to a valve of 7.2.

The slurry obtained in this way had a sufficiently high degree of dispersion to give satisfactory classification by centrifugal hydroclassification and, when the slurry was centrifuged, the solids deposited on the inner surface of the centrifuging bowls were not unduly thioxtropic.

*Example 2*

A quantity of calcined pigmentary titanium dioxide, which contained the usual residual quantity of conditioning agents and or rutile promoters, for example, ZnO, was ground sufficiently to enable substantially the whole of it to pass a 240 mesh sieve and was then stirred in fully softened water in a pre-mixing tank to give a slurry containing 400 grams of titanium dioxide per litre. Sodium silicate was added as a dispersing agent to the slurry in the pre-mixing tank until the pH of the slurry reached a value of 7.5. The actual quantity of sodium silicate added was 0.24% by weight calculated as $SiO_2$ and based on the $TiO_2$ content of the slurry. The slurry was stirred throughout the addition of the sodium silicate.

During this stage there was some adsorption of silicate ions by the titanium dioxide, possibly caused by reaction with, for example Zn ions, which may be present as a result of the previous use of a conditioning agent or rutile promoter as referred to hereinbefore, and some flocculation resulted.

The material in the pre-mixing tank was then transferred to a holding tank in which the material was intimately mixed with a quantity of a slurry of large particles of titanium dioxide that had been obtained in a manner described hereinafter. The pH of this slurry had been raised to a value of 8.6 by incorporating with the slurry about 0.2% of sodium silicate calculated as $SiO_2$ and based on the $TiO_2$ content of the slurry. The quantity of the slurry that was mixed with the material in the holding tank was sufficient to raise the pH of the contents of the holding tank to a value of 8.3.

The contents of the holding tank were then passed to a further tank where they were treated, while being stirred, with a quantity of an aqueous solution of sulphuric acid of 20 grams per litre strength sufficient to reduce the pH to a value of 7.4.

The material treated in this way was then fed continuously at a rate of 150 tons a day to the inlet of a modified Bird centrifuge of which the centrifuging bowl had a maximum internal diameter of 32 inches. The centrifuging bowl was driven at a rate of 900 revolutions per minute and the screw conveyor was driven at a rate of 892 revolutions per minute. The quantity of the said slurry of large particles in the material fed to the centrifuge was such that the rate of feed of the said slurry of large particles to the centrifuge was about 90 tons per day.

The fine particles (which constituted about 40% by weight of the material fed to the centrifuge) issued from one end of the centrifuging bowl and were collected and subjected to a surface treatment as described in Example 2 of British patent specification No. 18,463/59 and 40,676/59.

The coarse material, which issued from the other end of the centrifuging bowl consisted of large particles of titanium dioxide, together with some entrained fine particles. This coarse material was treated with a quantity of water sufficient to produce a slurry containing 460 grams of titanium dioxide per litre and with a quantity of sodium silicate sufficient to raise the pH of the slurry to a value of 8.6. A portion of this treated material was fed at a rate of 9.1 tons a day to a cyclone separator where a proportion of the coarse material (which was at a concentration of 900 grams per litre of titanium dioxide and constituted about 4% by weight of the fines) was fed off to counteract build up of large particles during a period of continuous operation. The remaining material from the cyclone (which was at a concentration of 406 grams of titanium dioxide per litre) was fed at a rate of 6.5 tons of titanium dioxide a day, together with the remainder of the said treated material, to receiver located over the holding tank. The contents of the receiver constituted the said slurry of large particles referred to hereinbefore and were added to the holding tank as required.

We claim:
1. A process for classifying a calcined pigment containing titanium dioxide particles, which comprises, treating an aqueous slurry of the pigment with a quantity of an alkaline-reacting dispersing agent sufficient to raise the pH of the slurry to at least 8.0, and disperse the pigment in the slurry thereafter adding to the slurry a sufficient quantity of an acid-reacting reagent to reduce the pH of the slurry to a value within the range of from 6.6 to 7.6 and provide a dispersed slurry which does not become thixotropic upon subsequent classification, and subjecting the resulting dispersed slurry to centrifugal hydroclassification to separate fine particles from coarse particles.

2. A process as claimed in claim 1, wherein the total quantity of the dispersing agent incorporated with the slurry is sufficient to raise the pH of the slurry to a value within the range of from 8.3 to 8.6.

3. A process as set forth in claim 1, wherein the pigment is wet ground after the dispersing agent is incorporated with it and before the addition of the acid-reacting reagent.

4. A process as set forth in claim 1, wherein there is incorporated with the coarse particles separated by the centrifugal hydroclassification sufficient water to form a slurry, there is incorporated with this slurry a quantity of the dispersing agent sufficient to raise the pH value of this slurry to at least 8.0 and this slurry, which constitutes an alkaline-reacting dispersing medium, is incorporated with a further quantity of the pigment before the addition of the acid-reacting reagent.

References Cited by the Examiner

UNITED STATES PATENTS

| | | | |
|---|---|---|---|
| 2,117,965 | 5/1938 | Kiesskalt et al. | 241—22 |
| 2,274,521 | 2/1942 | Berry | 241—22 |
| 2,378,432 | 6/1945 | Rethwisch et al. | 241—21 X |
| 2,402,167 | 6/1946 | Lang et al. | 241—22 |
| 2,581,414 | 1/1952 | Hochberg | 241—22 |
| 2,626,707 | 1/1953 | Whately | 209—5 |
| 2,855,156 | 10/1958 | Hochberg et al. | 241—22 |
| 2,990,291 | 6/1961 | Bartholomay | 241—22 |

ANDREW R. JUHASZ, *Primary Examiner.*

WILLIAM W. DYER, JR., *Examiner.*